Oct. 14, 1969   F. H. PARKER   3,472,484
SEALING MEANS FOR VALVE PORTS
Original Filed Aug 16, 1961   2 Sheets-Sheet 1

INVENTOR.
FRANK H. PARKER
BY
ATTORNEY

Oct. 14, 1969  F. H. PARKER  3,472,484

SEALING MEANS FOR VALVE PORTS

Original Filed Aug. 16, 1961  2 Sheets-Sheet 2

INVENTOR.
FRANK H. PARKER
BY
ATTORNEY

United States Patent Office 3,472,484
Patented Oct. 14, 1969

3,472,484
SEALING MEANS FOR VALVE PORTS
Frank H. Parker, Cleveland, Ohio, assignor to Stephen C. Peplin, North Olmsted, Ohio, trustee
Original application Aug. 16, 1961, Ser. No. 131,926, now Patent No. 3,193,245, dated July 6, 1965. Divided and this application Apr. 5, 1965, Ser. No. 454,235
Int. Cl. F16k 25/00
U.S. Cl. 251—172　　　　　　　　　　　　　　1 Claim

ABSTRACT OF THE DISCLOSURE

A valve inlet port sealing insert of generally cylindrical form having a forward area sealing face for sealing engagement with a movable valve element such as is employed in cylinder or ball type valves movable to convey and control the passage of fluid under pressure through the valve and having a cylindrical skirt for area sealing engagement with the adjacent cylindrical walls of the port in which the insert is carried, whereby said forward sealing face and the skirt are responsive to fluid pressure alone to exert axial and radial pressures thereon for providing an effective seal to confine the passage of fluid pressure axially through the insert.

---

This is a division of application Ser. No. 131,926, filed Aug. 16, 1961 and now Patent No. 3,193,245.

This invention relates to sealing means for valves, such as faucet valves either of the mixing or non-mixing type and more specifically is an improvement in gaskets or seals employed in valve inlet ports.

An important object of the invention is a sealing ring or annulus of this kind for removable mounting in a valve inlet passage and which is provided with a substantially flat annular sealing surface shaped to conform to the outer surface of the valve against which it is in sealing contact.

Another object is an effective seal or gasket of annular form possessing a degree of resiliency and which preferably is mounted directly in the fluid inlet passages or ports of the valve body to have fluid sealing contact therewith.

Another important object is to eliminate the necessity of forming sealing ring grooves, recesses or other relieved portions in the valve body or in the inlet passages as a means of maintaining the sealing ring in effective sealing contact with the valve and/or the ports in which it is carried.

Another object is a sealing element adapted to be carried and supported in a valve inlet passage in uninterrupted sealing contact with the wall defining the passage and having a portion extending into sealing contact with a valve member in a valve chamber characterized by a substantially flat annular surface contoured to the surface of a valve in the body.

A further object is a seal ring of the type disclosed having locating means formed thereon whereby to maintain the ring in the desired angular position with respect to its axis to insure effective sealing engagement of its flat valve sealing surface with the valve.

A still further object is a sealing ring having a substantially flat valve sealing surface contoured to the valve surface with which it is engaged whereby to permit rotation and/or reciprocation of the valve under continuous sealing contact with the ring.

A further object is a sealing ring characterized by its ability, when assembled in a valve inlet passage in a valve body, to respond to line fluid pressure in the passage whereby to exert a sealing pressure against the walls of the passage and also to exert a sealing pressure against a valve in the body.

A further object is a valve sealing ring which can easily be inserted in and removed from the inlet passage in which it is inserted without disassembling the valve body.

Another object is a valve sealing ring of simple and inexpensive construction and long wearing qualities to accomplish the above objects.

A still further object of the invention is a sealing valve member of the type disclosed which will prevent the passage of foreign particles such as scale, grit, etc., which may be present in the fluid stream passing through the inlet ports, from passing wholly or partially between the sealing face of the seal and the valve surface with which it is in contact.

Another object is a sealing ring construction including an annulus having a forward substantially flat valve sealing face contoured to the surface of the valve member for wiping engagement therewith under relative movement between the ring and the valve member and having a rearward skirt portion for sealingly engaging the inner wall of a port in which the ring is carried and wherein a fluid stream passing into the port will urge the sealing ring toward the valve member under the pressure of the fluid stream.

Still another object is an annular sealing member of the type disclosed herein for use in ball or cylinder type valves and having an annular sealing surface area contoured to the surface of the movable valve element in the valve body.

Other objects and advantages of this invention will become more apparent as the following descriptions of several embodiments thereof progress, reference being made to the accompanying drawings in which like reference characters are employed to designate like parts throughout the same.

In carrying out my invention, as a simple, practical and effective sealing means adapted to be carried in a valve inlet port or ports for sealing contact with a movable valve member, I provide, in the broader sense, a sealing ring or annulus formed preferably as a unitary structure from a suitable resilient impervious material such as Buta-N and which has a forward substantially flat annular sealing face contoured to the surface of a movable valve member against which it is pressed into sealing contact, and which also has a rearwardly extending skirt portion to lie within and to have sealing engagement with the wall defining the bore of the port in which the sealing means is carried. The invention also contemplates a sealing ring construction which, when in position in an inlet port of the valve will be urged into sealing contact with the movable valve member and the walls of the bore under the influence of fluid pressure supplied to the port. In the several embodiments illustrated, the skirt portion of the sealing means is characterized by having a greater flexibility than that of the forward sealing portion. While my invention is illustrated as applied to a mixing valve, I do not intend to limit it to such use since the same may equally well be employed in valves having a single fluid inlet. Furthermore, the invention may be applied to types of valves other than cylinder or plug valves, such, for instance, as ball type valves.

Figure 1:
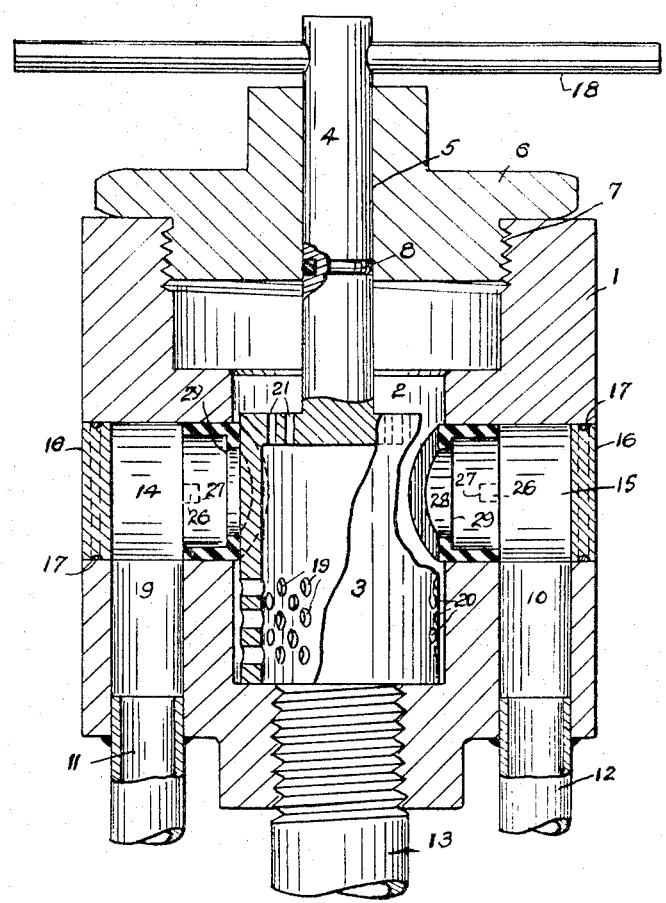
FIGURE 1 illustrates an embodiment of my invention shown applied in the inlet passages of a cylinder or plug type mixing valve.
Figure 3:
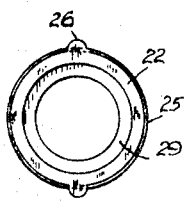
FIGURE 3 is a rear end view of the sealing ring.
Figure 2:
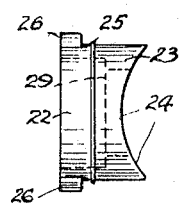
FIGURE 2 is a side view of the sealing ring shown in FIGURE 1.
Figure 4:
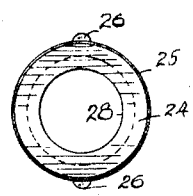
FIGURE 4 is a front end view of the same.

Referring now to FIGURES 1–5, inclusive, and more particularly to FIGURE 1, I have shown an embodiment of the invention as applied in use in a mixing valve wherein the valve body 1 is formed with a mixing chamber 2 in which a hollow valve 3 operates. In the valve construction shown, the valve 3 is provided with a stem 4 carried in a central opening 5 in the valve cap 6. The cap 6 is threaded as at 7 into the upper part of the valve body and the stem is sealed in the opening 5 against the passage of fluid pressure by means of a sealing ring 8 carried by the stem and engaging the wall of the opening 5. The valve body 1 is also provided with a pair of inlet passages 9 and 10 into which are secured the ends of inlet pipes 11 and 12, respectively, one of the pipes carrying a fluid such as hot water and the other pipe carrying cold water. A discharge pipe 13 is secured in the base of the body 1 and communicates with the interior of the mixing chamber 2.

Each of the inlet passages 9 and 10 communicates with diametrically opposed inlet ports 14 and 15, respectively, formed in the valve body. These ports preferably lie transversely of the valve body and are closed off at their outer extremities by means of plugs 16 which are permanently sealed by means of solder rings 17 which, upon the application of sufficient heat, will seal and bind the plugs in place, as indicated in FIG. 1.

The ports 14 and 15, being diametrically opposed, open at their ends into the mixing chamber 2.

The valve 3 is capable of rotational movement in either direction about a substantially vertical axis within the valve chamber 2 and is also capable of axial movement therein, depending upon the directional force applied to the valve handle 18. The valve 3 is provided with a plurality of orifices whose axes are radial to the longitudinal axis of the valve 3 and these orifices preferably are grouped as at 19 and 20 on opposite sides of the valve 3 so that they may be brought into selected communication with the inlet ports 14 and 15, respectively, to control not only the volume of fluid flowing from the inlets 14 and 15 into the hollow valve 3, but also to control the relative proportion of each fluid passing into the hollow valve 3 from the inlets. The volume of flow is controlled by the longitudinal or axial adjustment of the valve 3 within the valve body, while the proportion of fluids entering through the ports 14 and 15 is controlled by the rotational angular position of the ports 19 and 20 with respect to the said inlets.

The hollow valve 3 is open at its bottom end and is provided with passages 21 at its upper end communicating the interior of the hollow valve 3 with the chamber 2 and thus to equalize the fluid pressure in the valve from within and without the valve member 3, thereby balancing the valve and thus increasing the case by which the valve may be rotated or shifted axially within the valve body.

In accordance with my invention. I have provided a novel sealing means of several modified forms as will be described hereinafter.

First, referring to FIGURES 1 to 4, inclusive, the valve sealing means comprises an annulus of resilient, impervious and flexible material, preferably a rubber or plastic composition. I have found that Buta-N having a durometer of 70 to 80 would be a satisfactory material for the purposes intended.

Such a sealing annulus as is indicated in these figures includes as a unitary structure an annular skirt portion 22 and a forward portion of annular form 23 which is provided with a substantially flat annular face 24 having surface sealing contact with the outer surface of the valve 3 when the parts are in the position shown in FIGURE 1. The sealing area of the annulus thus is considerably increased over that provided by sealing means of the O-ring type which have substantially only a line sealing contact with the movable valve element. Thus, not only a better and more effective seal is obtained, but such an uninterrupted annular surface seal of the present invention is effective in preventing the passage of grit or other foreign solid matter through the inlet ports with possible scoring of the sealing surfaces or lodgment of the same therebetween.

The sealing annulus 23 is provided on its skirt portion 22 with an integral annular outwardly extending compressible sealing bead 25. The bead 25 extends outwardly only sufficiently to be subjected to light compression when installed in the port. Locating and positioning ears or lugs 26 formed preferably integral with the annulus 23 extend radially outwardly of the rear skirt portion 22 and are adapted to be received in recesses 14 and 15. When the sealing annuli are positioned in the inlet ports as illustrated in FIG. 1, the contoured substantially flat sealing face 24 of each annulus will be angularly positioned with the axis of the port for proper sealing engagement with the movable element of the valve, such as a valve cylinder or ball, as the case may be.

The annulus is also formed with an annular inwardly extending portion 28 as an integral part thereof, its forward face comprising the contoured sealing surface 24 while its rear face 29 constitutes an annular abutment against which fluid or mechanical pressure may be exerted to augment the sealing pressure of the face 24 against the movable valve element 3. As will be seen from the drawing, the bore of the annulus through the skirt portion 22 is of greater diameter than that of the bore through the head or forward end of the annulus, and since the outer wall of the head and skirt portions are of the same diameter (excluding the bead and the ears 26), the thickness of the skirt wall will be less than that of the forward end portion of the annulus.

Fluid pressure in the ports will thus not only augment the sealing pressure axially of the annulus as the fluid pressure is exerted against the rear face 29 but will, at the same time, exert a sealing pressure radially and circumferentially against the relatively thinner wall of the skirt 22.

Figure 5:
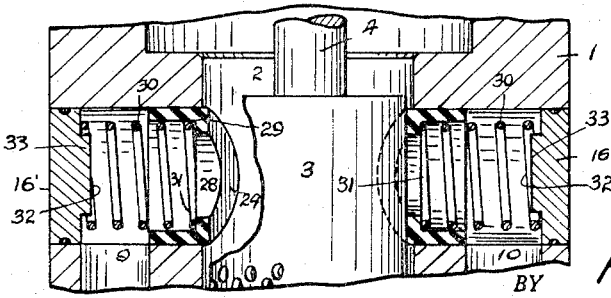
FIGURE 5 illustrates the sealing ring spring loaded and assembled in an inlet passage of a valve construction.

In FIGURE 5, I have illustrated the invention as applied in use wherein a coiled light compression spring 30 is assembled with one end 31 telescoped within the skirt of the annulus and abutting the rear face 29 thereof, while the opposite end 32 of the spring 30 overlies a positioning abutment 33 formed on the plug 16' and engages the inner face of the plug. In this form, both line fluid and mechanical pressure are exerted axially of the annulus, but only line fluid pressure is exerted radially against the relatively thin skirt wall 22.

Figure 7:
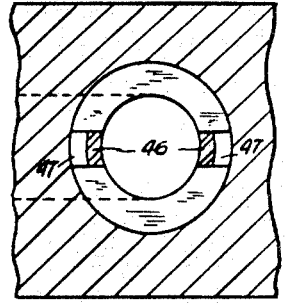
FIGURE 7 is a section taken on line 7—7 of FIGURE 6.
Figure 6:
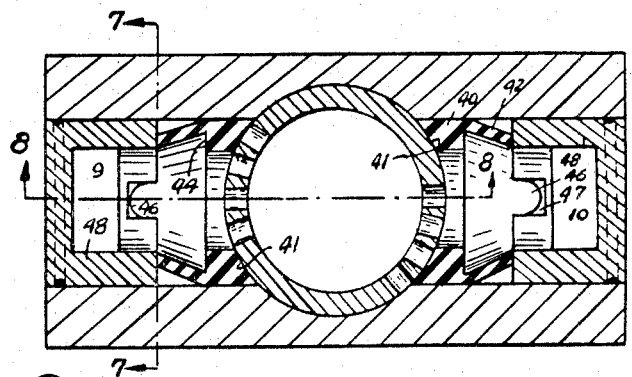
FIGURE 6 is a transverse section through a modified form of the invention illustrated in FIGURES 1 to 5, inclusive.
Figure 8:
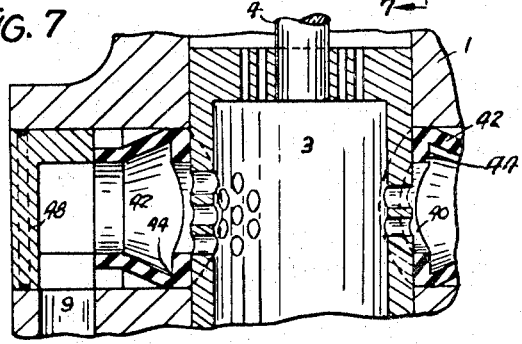
FIGURE 8 is a section taken on line 8—8 of FIGURE 6.
Figure 12:
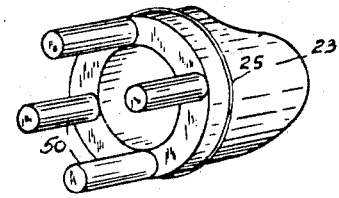
FIGURE 12 is a rear perspective view of the insert sealing member shown in FIGURES 9–10 and 11.
Figure 9:
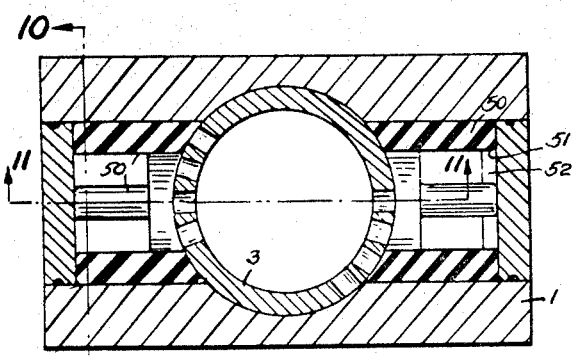
FIGURE 9 is a transverse section through a second modified form of the invention.
Figure 10:
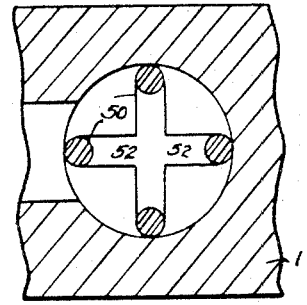
FIGURE 10 is a section taken on line 10—10 of FIGURE 9.
Figure 11:
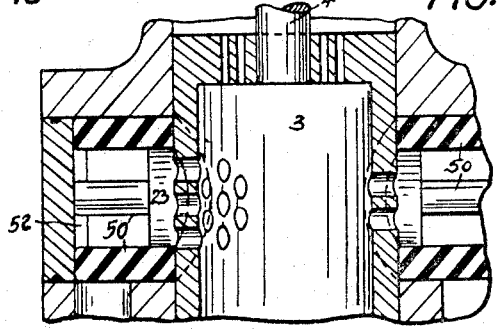
FIGURE 11 is a section taken on line 11—11 of FIGURE 9.

In FIGURES 6, 7 and 8, I have illustrated a modified form of the invention in which the sealing annulus includes a head portion 40 having a substantially flat forward sealing surface 41 contoured to the outer surface of the movable valve element against which it seals, and a rearwardly extending annular skirt portion 42 preferably integral with the forward portion and whose cylindrical wall 42 converges rearwardly and terminates at a point where its interal diameter is substantially the same as that of the internal diameter of the head portion 40 but that, due to the converging side walls of the skirt, the internal diameter of the skirt portion progressively increases from the base or rear of the annulus to a point where the converging walls join the head portion, thereby providing an annular ledge 44 at the rear of the sealing head portion against which fluid under pressure can exert an augmented sealing pressure to the sealing surface of the head. Since the skirt portion converges rearwardly from the head to its base, its outer surface will be spaced from the inner wall of the port in which the member is inserted. Positioning ears 46 project rearwardly from the skirt of the annulus and are provided for the purpose of properly aligning the sealing surface of the seal with the surface of the movable valve element and to retain the seal in such position in use. The ears 46 are insertable in relieved portions 47 of the port and member 48 which is hollow and communicates with the fluid inlets 9 and 10 of the valve body 1.

This embodiment of the invention has the advantage of directing the exertion of the forces of fluid pressure longitudinally and divergingly toward and against the undersurface 44 of the annular head portion over a greater area of that surface than in that embodiment previously described.

In FIGS. 9, 10, 11 and 12, I have disclosed a further modified form of the invention which is similar in most respects to that illustrated in FIGS. 1 through 5 except that the skirt portion of the contoured sealing annulus consists of a plurality of circumferentially spaced legs 50 which abut at their rear ends the outer end of the inlet ports. The free ends of these legs may be positioned in relieved sockets or relieved portions 51 formed in the member 52 so as to properly align and retain the sealing annulus in its proper position as hereinbefore described in connection with the other forms of the invention.

From the above description of the several embodiments, it will be seen that I have provided a sealing annulus preferably molded or formed as an integral unit and which, by its construction, is easily insertable and removable in the inlet ports of a valve body and which is provided with means for locating or positioning and maintaining the seal in exact and proper position in the port so that its contoured sealing surface will mate the surface of the movable valve element against which it is thrust. Furthermore, the invention provides an annular sealing insert for the inlet ports of a valve body which insures adequate radial and longitudinal sealing contact with the inner wall of the port, as well as with the surface of the movable valve element and that the sealing element will at all times be restricted against rotational movement within the inlet port.

I claim:

1. A valve-seal insert for use with a valve body having a valve chamber therein, a movable valve element in said chamber, said body having a fluid inlet port and a fluid outlet port, said valve-seal insert for use in said inlet port comprising a cylindrical thin-walled member having a forward face for contoured sealing contact with said movable valve element, said insert having an integral elongate skirt portion extending rearwardly of the face of said valve-seal insert in contact with said valve element and in direct sealing contact throughout its length with the wall of said inlet port, whereby fluid pressure is utilized against said skirt to exert a sealing pressure throughout the said skirt and against the forward face of said insert to sealingly engage the same respective with said inlet-port inner wall and said movable valve element.

References Cited

UNITED STATES PATENTS

| 944,598 | 12/1909 | Caskey | 251—174 X |
|---|---|---|---|
| 2,099,992 | 11/1937 | Sutcliffe | 251—174 |
| 2,845,948 | 8/1958 | Parker | 251—172 X |
| 3,056,418 | 10/1962 | Adams | 251—172 X |
| 3,156,260 | 11/1964 | Harvey | 251—174 X |

HAROLD W. WEAKLEY, Primary Examiner

U.S. Cl. X.R.

137—625.41, 636.4; 251—174